United States Patent
Wu et al.

(10) Patent No.: US 10,999,801 B2
(45) Date of Patent: May 4, 2021

(54) DISCONTINUOUS RECEPTION TIMER OPERATION FOR CHANGED TTI LENGTH

(71) Applicant: Nokia Technologies Oy, Espoo (FI)

(72) Inventors: Chunli Wu, Beijing (CN); Benoist Pierre Sebire, Tokyo (JP)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 16/074,062

(22) PCT Filed: Feb. 3, 2016

(86) PCT No.: PCT/CN2016/073348
§ 371 (c)(1),
(2) Date: Jul. 30, 2018

(87) PCT Pub. No.: WO2017/132899
PCT Pub. Date: Aug. 10, 2017

(65) Prior Publication Data
US 2019/0045440 A1    Feb. 7, 2019

(51) Int. Cl.
*H04W 76/28* (2018.01)
*H04W 52/02* (2009.01)

(52) U.S. Cl.
CPC ... *H04W 52/0251* (2013.01); *H04W 52/0212* (2013.01); *H04W 52/0216* (2013.01);
(Continued)

(58) Field of Classification Search
CPC ......... H04W 52/0251; H04W 52/0216; H04W 52/0258; H04W 52/0212; H04W 52/0219;
(Continued)

(56) References Cited

U.S. PATENT DOCUMENTS 8,625,486 B2 * 1/2014 Wang ............... H04L 1/1812
370/328
2007/0291728 A1 * 12/2007 Dalsgaard ............ H04L 12/12
370/347
(Continued)

FOREIGN PATENT DOCUMENTS

CN    101971554 A    2/2011
CN    102761942 A    10/2012
(Continued)

OTHER PUBLICATIONS

"New SI proposal: Study on Latency Reduction Techniques for LTE", 3GPP TSG RAN Meeting #67, RP-150465, Agenda Item: 13.1.2, Ericsson, Mar. 9-12, 2015, 8 pages.
(Continued)

*Primary Examiner* — Joshua Kading
(74) *Attorney, Agent, or Firm* — Harrington & Smith

(57) ABSTRACT

While a transmission time interval (TTI) length of other than 1 ms is in effect for communication between mobile and network nodes, at least one timer related to discontinuous reception (DRX) is implemented according to a rule that defines a time duration of the timer different from a time duration of the same timer implemented when the TTI length is defined as 1 ms. There are a plurality of such DRX-related timers, and in certain embodiments each is associated with one rule of a set of rules for implementing the respective timer when the TTI length is other than 1 ms; and in particular examples the timers are associated with groups for this purpose and all the timers of at least one of the groups is implemented according to the same rule of the set. Thus new DRX parameters need not be sent anytime the TTI length changes.

20 Claims, 2 Drawing Sheets

202: determine that a transmission time interval (TTI) length is other than 1 ms for communication between a mobile node and a network node 204: while said TTI length of other than 1 ms is in effect, implement at least one timer related to discontinuous reception (DRX) according to a rule that defines a time duration of the timer different from a time duration of the same timer implemented when the TTI length is defined as 1 ms

(52) U.S. Cl.
CPC ... *H04W 52/0219* (2013.01); *H04W 52/0258* (2013.01); *H04W 76/28* (2018.02); *H04W 52/0222* (2013.01)

(58) Field of Classification Search
CPC ......... H04W 52/0222; H04W 52/0225; H04W 76/28
See application file for complete search history.

(56) References Cited

U.S. PATENT DOCUMENTS

| | | | |
|---|---|---|---|
| 2009/0016252 A1 | 1/2009 | Ho et al. | |
| 2009/0168731 A1 | 7/2009 | Zhang et al. | |
| 2009/0232118 A1 | 9/2009 | Wang et al. | |
| 2013/0121220 A1* | 5/2013 | Virtej | H04W 52/0241 370/311 |
| 2013/0163497 A1* | 6/2013 | Wei | H04L 5/0007 370/311 |
| 2015/0092542 A1 | 4/2015 | Yang et al. | |
| 2015/0305083 A1* | 10/2015 | Heo | H04W 36/14 370/329 |
| 2016/0183325 A1* | 6/2016 | Harada | H04W 36/00 370/328 |
| 2017/0164363 A1* | 6/2017 | Zhang | H04L 1/00 |
| 2018/0176934 A1* | 6/2018 | Uchino | H04W 72/1231 |

FOREIGN PATENT DOCUMENTS

| | | |
|---|---|---|
| CN | 103108386 A | 5/2013 |
| CN | 104468030 A | 3/2015 |
| CN | 104703260 A | 6/2015 |

OTHER PUBLICATIONS

"Areas for Latency Reduction", 3GPP TSG-RAN WG2 #91, R2-153489, Agenda Item: 7.11, Ericsson, Aug. 24-28, 2015, pp. 1-7.

"3rd Generation Partnership Project; Technical Specification Group Radio Access Network; Evolved Universal Terrestrial Radio Access (E-UTRA); Study on latency reduction techniques for LTE (Release 13)", 3GPP TR 36.881, V0.5.0, Nov. 2015, pp. 1-86.

"Introduction of SC-PTM", 3GPP TSG-RAN WG2 Meeting #91, R2-153889, Huawei, Aug. 24-28, 2015, 24 pages.

"3rd Generation Partnership Project; Technical Specification Group Radio Access Network; Evolved Universal Terrestrial Radio Access (E-UTRA); Medium Access Control (MAC) protocol specification (Release 13)", 3GPP TS 36.321, V13.0.0, Dec. 2015, pp. 1-82.

International Search Report and Written Opinion received for corresponding Patent Cooperation Treaty Application No. PCT/CN2016/073348, dated Jul. 26, 2016, 12 pages.

* cited by examiner

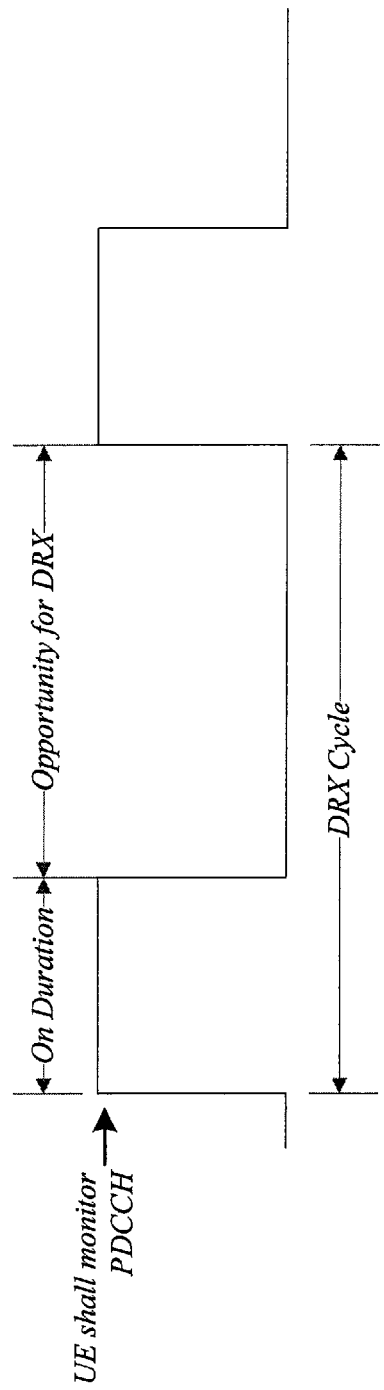
FIG. 1: Prior Art

202: determine that a transmission time interval (TTI) length is other than 1 ms for communication between a mobile node and a network node 204: while said TTI length of other than 1 ms is in effect, implement at least one timer related to discontinuous reception (DRX) according to a rule that defines a time duration of the timer different from a time duration of the same timer implemented when the TTI length is defined as 1 ms

FIG. 2

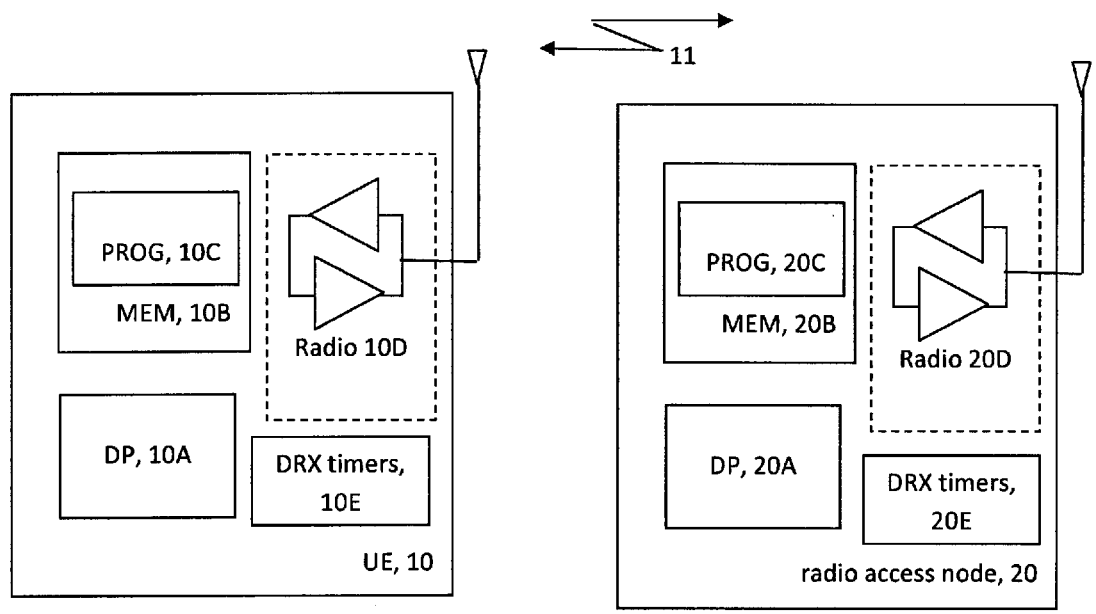

FIG. 3

DISCONTINUOUS RECEPTION TIMER OPERATION FOR CHANGED TTI LENGTH

RELATED APPLICATION

This application was originally filed as PCT Application No. PCT/CN2016/073348 on Feb. 3, 2016.

TECHNOLOGICAL FIELD

The described invention relates to wireless communications, and more particularly to various timers related to discontinuous reception (DRX).

BACKGROUND

Acronyms used herein are listed below following the detailed description.

The 3GPP sets various goals to guide the development of future iterations of wireless communications, a current one of which is set forth in a study item by Ericsson and Huawei at document RP-150465 entitled LATENCY REDUCTION TECHNIQUES FOR LTE [3GPP TSG RAN Meeting #67; Shanghai, China; Mar. 9-12, 2015]. Section 4.1 of that document sets for the following objective:

Study enhancements to the E-UTRAN radio system in order to:
  Significantly reduce the packet data latency over the LTE Uu air interface for an active UE
  Significantly reduce the packet data transport round trip latency for UEs that have been inactive for a longer period (in connected state).
That same section further quotes from RAN1 #83 that the following area should be studied from the physical (PHY) layer
  TTI shortening and reduced processing times [RAN1]:
    Assess specification impact and study feasibility and performance of TTI lengths between 0.5 ms and one OFDM symbol, taking into account impact on reference signals and physical layer control signaling backwards compatibility shall be preserved (thus allowing normal operation of pre-Rel 13 UEs on the same carrier);

Conventionally the TTI length in E-UTRA networks is 1.0 milliseconds (ms). There has been some investigation into the ramifications of shortening this TTI length; see for example 3GPP TR 36.881 v0.5.0 (2015-11) which sets out a TCP performance evaluation for a shorter TTI This study shows that that the best performance is achieved with a mix of TTI lengths; see for example the conclusions at section 11. In this regard document R2-153889 by Ericsson, entitled AREAS FOR LATENCY REDUCTION [3GPP TSG-RAN WG2 #91; Beijing, P. R. China; Aug. 24-28, 2015] explains that since the initial window size for each TCP connection is very small and the increase is steeper for each size increment, the effect of latency reductions for both RTT and HARQ RTT are more considerable for the slow start phase. It follows that it would be beneficial to first start with a short TTI length and then increase it.

From the above referenced documents it appears likely that a new TTI length will be introduced for future wireless cellular communications. The inventors herein consider that such a new TTI length will impact various operations related to discontinuous reception (DRX), but the only prior art recognition of such impact is seen to be at section 3.3 of document R2-153889 which recognizes that the UE may in certain instances have an increased DRX opportunity due to a shorter active transmit time (specifically, no longer needing to send padding bits when obtaining a fast uplink grant that the shorter TTI enables). DRX is an energy saving concept well-established in the cellular wireless arts and for context certain specifics of conventional DRX operation in the E-UTRAN system are outlined in the description below. Embodiments of these teachings address at last some aspects of DRX operation when the TTI length is changed.

SUMMARY

According to a first aspect of these teachings there is a method for operating a mobile node such as a user equipment and/or for operating a network node such as an eNodeB. According to this method it is determined that a transmission time interval (TTI) length is other than 1 ms for communication between a mobile node and a network node; and while said TTI length of other than 1 ms is in effect, at least one timer related to discontinuous reception (DRX) is implemented according to a rule that defines a time duration of the timer different from a time duration of the same timer implemented when the TTI length is defined as 1 ms.

According to a second aspect of these teachings there is a computer readable memory storing computer program instructions that, when executed by one or more processors, cause a host apparatus such as the UE and/or eNodeB to perform the method above.

According to a third aspect of these teachings there is an apparatus comprising at least one processor and a memory storing software code. The memory and the software code is configured with the at least one processor to cause the apparatus to at least: determine that a transmission time interval (TTI) length is other than 1 ms for communication between a mobile node and a network node; and while said TTI length of other than 1 ms is in effect, implement at least one timer related to discontinuous reception (DRX) according to a rule that defines a time duration of the timer different from a time duration of the same timer implemented when the TTI length is defined as 1 ms.

According to a fourth aspect of these teachings there is an apparatus comprising determining means and timing means. The determining means is for determining that a transmission time interval (TTI) length is other than 1 ms for communication between a mobile node and a network node. And the timing means is for implementing at least one timer related to discontinuous reception (DRX), while said TTI length of other than 1 ms is in effect, according to a rule that defines a time duration of the timer different from a time duration of the same timer implemented when the TTI length is defined as 1 ms. In one specific embodiment the determining means comprises a radio, at least one processor and a memory storing software code; and the timing means comprises the at least one processor and the memory storing the software code.

BRIEF DESCRIPTION OF THE DRAWINGS

FIG. 1 is a prior art schematic diagram illustrating a two example DRX related timers along a horizontal axis that different ones of the DRX timers measure in terms of time duration, subframe count or in terms of 1 ms time intervals.

FIG. 2 is a process flow diagram summarizing certain of the above teachings.

FIG. 3 is a high level schematic block diagram illustrating certain apparatus/devices that are suitable for practicing certain of these teachings.

DETAILED DESCRIPTION

The specific embodiments and examples below are in the context of E-UTRAN cellular technology and as such are directed towards a UE that might be compliant with 3GPP Rel-14, or possibly a 5G UE since frame structure flexibility for low latency is also currently promoted as one possible 5G feature. But these specifics are to describe the inventive concepts herein more clearly and are not a limitation to the broader teachings herein which are not bound by any specific radio access technology, or by the specific timer names used herein by example.

As a general overview of the DRX concept consider FIG. 1 which for simplicity is valid for 3GPP Rel-8 prior to the implementation of carrier aggregation. The PDCCH gives resource allocations to multiple mobile terminals for resources in the downlink and uplink shared channels (physical downlink and uplink shared channels PDSCH and PUSCH), which is/are the logical channel(s) in which lay the resources that the PDCCH allocates. The network configures each mobile terminal in the cell that is in an RRC Connected state with a series of DRX parameters that set the DRX cycle for that mobile terminal. During its On Duration the terminal will monitor the PDCCH to see if it is addressed, meaning that PDCCH will have a resource allocation for that specific terminal. Different terminals have different DRX parameter sets, so two terminals may have the same DRX cycle and On Duration or different terminals may have On Durations that overlap one or more PDCCHs. This is because any given PDCCH can address, and therefore allocate radio resources to, multiple terminals at once.

If no PDCCH during a terminal's On Duration addresses that terminal, the terminal can enter its DRX state immediately afterwards which allows it to go into a low energy mode to save its limited energy (battery) reserve by operating certain circuitry such as its radio receiver in a low power or off state.

If a PDCCH during the On Duration does allocate radio resources to a terminal then an inactivity timer is started upon reception of the resource allocation, and the terminal must delay the onset of when it enters the DRX period until the inactivity timer is expired. If the terminal is scheduled to receive downlink data in a PDSCH but does not correctly receive it, it sends a negative acknowledgement and starts retransmission timer. The terminal stays active when inactivity timer or retransmission timer is running.

While the carrier aggregation used in E-UTRAN makes this basic scheduling a bit more complex in that a PDCCH on one carrier can schedule resources for a terminal in another carrier, the general concept that DRX parameters establish the specific periods during which the terminal may operate at reduced power and refrain from actively monitoring for network signaling remains largely the same.

Among these DRX parameters are values for various DRX related timers. The On Duration timer and the DRX cycle timer are shown at FIG. 1 which is reproduced from Figure 3.1-1 of 3GPP TS 36.321. There is also an Active Time that describes the total time of a DRX cycle in which the terminal may not be in the DRX reduced-power state, but because the active time can vary from cycle to cycle (depending on whether the PDCCH scheduled the terminal, and whether any re-transmissions are needed) there is no specific timer for the active time and it is defined in terms of other timers rather than signaled to the terminal as a DRX parameter.

Following are some relevant times and DRX-related timers for E-UTRAN, taken from 3GPP 36.321 v13.0.0 (2015-12) (see for example section 5.7) with added commentary describing what the underlying timer actually 'refers to':

Active Time: Time related to DRX operation, during which the MAC entity monitors the PDCCH.
refers to other timers; the active time is the result of other timer(s) running mac-ContentionResolutionTimer: Specifies the number of consecutive subframe(s) during which the MAC entity shall monitor the PDCCH after Msg3 is transmitted.
refers to subframes DRX Cycle: Specifies the periodic repetition of the On Duration followed by a possible period of inactivity.
refers to ms.

drx-InactivityTimer: Specifies the number of consecutive PDCCH-subframe(s) after the subframe in which a PDCCH indicates an initial UL, DL or SL user data transmission for this MAC entity.
refers to PDCCH subframes drx-RetransmissionTimer: Specifies the maximum number of consecutive PDCCH-subframe(s) until a DL retransmission is received.
refers to PDCCH subframes drxShortCycleTimer: Specifies the number of consecutive subframe(s) the MAC entity shall follow the Short DRX cycle.
refers to ms.

drxStartOffset: Specifies the subframe where the DRX Cycle starts.
refers to subframe HARQ RTT Timer: This parameter specifies the minimum amount of subframe(s) before a DL HARQ retransmission is expected by the MAC entity.
refers to subframes.

onDurationTimer: Specifies the number of consecutive PDCCH-subframe(s) at the beginning of a DRX Cycle.
refers to PDCCH subframes In the above, 'PDCCH subframe' refers to a subframe with a PDCCH. For a MAC entity configured with only FDD serving cell(s), this represents any subframe; for a MAC entity configured with at least one TDD serving cell, if a MAC entity is capable of simultaneous reception and transmission in the aggregated cells, this represents the union over all serving cells of downlink subframes and subframes including DwPTS of the TDD UL/DL configuration indicated by the parameter tdd-Config, except serving cells that are configured with schedulingCellId; otherwise, this represents the subframes where the Special Cell (SpCell in dual connectivity operations, typically the Primary Cell or PCell) is configured with a downlink subframe or a subframe including DwPTS of the TDD UL/DL configuration indicated by the parameter tdd-Config. For RNs with an RN subframe configuration configured and not suspended, in its communication with the E-UTRAN, this represents all downlink subframes configured for RN communication with the E-UTRAN.

According to one example embodiment of the invention the DRX-related timers are classified into two ore more distinct groups, and when the TTI length changes from 1 ms to something different (for example, to 0.5 ms) then the different rules would be applied for the timers associated with these the different groups. The rules simplify reconfigurations due to TTI length changes by not only reducing overhead but also ensuring that changing TTI length is consistent with, for example, QoS or HARQ operation, and therefore avoid stupid reconfigurations introducing additional error cases.

As one example, assume there are only two groups and the DRX-related timers are classified or otherwise associated with these two groups as follows: For instance, DRX timers could be classified into two groups:

First Group/Type 1 DRX timer: Timers in subframe or ms with 1 ms subframe TTI length; for example mac-ContentionResolutionTimer, DRX Cycle, drxShortCycleTimer, HARQ RTT Timer.

Second Group/Type 2 DRX timers: Timers in PDCCH-subframe; for example onDurationTimer, drx-InactivityTimer, drx-Retransmission Timer.

In this example assume there are three different rules that may be applied/associated with any given timer or group:

Rule 1/Option 1: define a new sub-PDCCH-subframe which refers to a TTI length (e.g. sub-PDCCH-subframe is 0.5 ms if TTI length is 0.5 ms), and the timers are counted in number of TTIs with PDCCH.

Rule 2/Option 2: sub-subframe (e.g. 0.5 ms with TTI length of 0.5 ms, regardless of whether it has PDCCH region) is defined and scale the timers to TTI length when changing the TTI.

Rule 3/Option 3: keep the timers unchanged regardless of the TTI length and always refer to 1 ms duration or 1 ms subframe length.

Sorting timers into groups as in the example above, and defining the rules that apply for each group, could either be fixed in the radio access technology specifications or may rely on signaling from the eNodeB. In different embodiments this signaling can be RRC signaling or MAC signaling (for instance via a MAC control element CE). For example, the rules themselves may be fixed per the controlling radio access technology specifications but the eNodeB has flexibility to associate different ones of those published rules to different ones of the DRX-related timers, and the eNodeB can signal the rule-to-timer or rule-to-timer-group associations in System Information or via dedicated RRC or MAC signaling to the affected UE.

In systems in which the TTI length can be changed between 1 ms and something other than 1 ms, in an embodiment these rules would be applied only while the 'other than 1 ms' TTI length is in effect. So for example in a given cell assume there are two UEs, UE1 which is a legacy UE and UE2 which is capable of operating with 0.5 ms TTI length. The eNodeB may communicate with legacy UE1 using only the 1 ms TTI length, but when communicating with UE2 it may switch between TTI lengths of 1.0 ms and 0.5 ms. UE1 will not apply these rules regardless since being a legacy UE it cannot operate with other than a 1.0 ins TTI length; UE2 which can operate with either 1.0 ms or 0.5 ms TTI lengths will apply these rules only during those periods while the 0.5 ms TTI length is in effect for its communications with the eNodeB. The timers are reset when the TTI length changed. Alternatively, the timers which are running can continue to be running but the unit is scaled according to the TTI length. In effect here means configured via RRC or activated via MAC or PDCCH.

In one example the eNodeB can inform the UE2 about the different rules to apply for DRX-related timer operation when the eNodeB-UE2 communications use 0.5 ms TTI length by a) including a flag or other such indicator in System Information informing listening UEs that different rules for implementing DRX-related timers are in effect while 0.5 ms TTI length is in use; and b) signaling to the UE2 when it registers to the cell a mapping of exactly which of the published rules are associated with which of the DRX-related timers (or timer-groups). The association of specific DRX-related timers to an individual timer group may be in the published radio standard, or may be flexibly implemented at the radio-access level via the eNodeB signaling the specific timer-group associations (for example in System Information so that the same timer-to-group associations are used cell-wide).

Given the above example rules, the following principles may be used when grouping the timers and selecting which rules to associate to which timers or groups of timers:

For the timers based on QoS, scaling to the TTI length is not needed and Rule 3/Option 3 (keep the timer unchanged regardless of the TTI length) is most appropriate. The timers mac-ContentionResolutionTimer, DRX Cycle, drxShortCycleTimer would belong to this group.

The HARQ RTT timer should scale to TTI length as it defines how long the UE can sleep before it receives its next DL retransmission, which depends on both the TTI length and eNodeB processing time. Rule 2/Option 2 is applicable here where all the sub-subframes (with length of TTI length) are counted regardless of whether it contains PDCCH or not.

The drx-InactivityTimer is restarted when PDCCH for a new transmission is received. With a shorter TTI such as 0.5 ms, with the Rule 1/Option 1 the sub-PDCCH-subframe is 0.5 ms and the timer is in the number of sub-PDCCH-subframes. A PDCCH received in a 0.5 ms TTI restarts the timer. Alternatively with Rule 3/Option 3, the timer is still in PDCCH-subframe and any of the two PDCCH that can occur within the 1 ms subframe (sub-PDCCH-subframe) restarts the timer.

The drx-RetransmissionTimer is currently in number of PDCCH subframes until PDCCH for DL retransmission is received with the conventional 1 ms TTI length. With the shorter TTI length, the Rule 1/Option 1 can define these timers as the number of sub-PDCCH-subfames, i.e. the length is scaled to the TTI length. Alternatively with Rule 3/Option 3, they can still be defined as the number of subframes, A PDCCH received within any of the sub-PDCCH-subframe stops the drx-RetransmissionTimer.

onDurationTimer is currently in number of PDCCH subframes. Similar to the retransmission timer, either Rule 1/Option 1 or Rule 3/Option 3 can be applied.

Apart from the timers above, the drxStartOffset timer specifies the subframe where the DRX Cycle starts (for example, if unlike FIG. 1 the On Duration timer/first monitored PDCCH were located at some offset from the start of the DRX Cycle). With a shorter TTI and if finer granularity than 1 ms is to be supported to make it possible to start the On Duration timer at any 0.5 ms TTI of the cycle, extra bits could be added to indicate the value of the offset within the 1 ms. So for example if the 0.5 ms TTI length is in effect, one bit (on top of the current legacy siganaling for 1 ms TTI length) can be used to indicate the ON Duration timer it starts at the first 0.5 ms or second 0.5 ms sub-subframe of the 1 ms subframe that is indicated by the drxStartOffset timer. Or alternatively the drxStartOffset timer can scale with TTI length if the DRX Cycle timer also scales with TTI length.

Compiling the above groupings and rule associations for the various tiemrs yields the following, assuming the drxStartOffset timer does not scale and the extra bit is available for indicating whether the onDuration timer starts in the fiorst or second 0.5 ms half of the 1 ms subframe indicated by the un-scaled drxStartOffset timer:

| Timer | Type | Rule |
| --- | --- | --- |
| mac-ContentionResolution | Group 1/Type 1 | Rule 3/Option 3 |
| DRXCycle | Group 1/Type 1 | Rule 3/Option 3 |
| drxShortCycle | Group 1/Type 1 | Rule 3/Option 3 |
| drxStartOffset | Group 1/Type 1 | Rule 3/Option 3 |
| HARQ RTT | Group 1/Type 1 | Rule 2/Option 2 |
| drx-Inactivity | Group 2/Type 2 | Rule 1/Option 1 or Rule 3/Option 3 |
| drx-Retransmission | Group 2/Type 2 | Rule 1/Option 1 or Rule 3/Option 3 |
| onDuration | Group 2/Type 2 | Rule 1/Option 1 or Rule 3/Option 3 |

Grouping the timers and having rules specified as in the above examples makes changing the TTI length easier at the radio access level because then the DRX-related timers do not need to be explicitly re-configured every time the TTI length changes. But these are only examples, and it may be during deployment of the 0.5 ms TTI length that a given cell may find it useful to only change how one DRX related timer is implemented. In this case having the rules specified in advance can also help because, even if this cell does not utilize grouping of DRX timers in this instance it can signal an association of the relevant rule for that one DRX related timer. So for example if this cell decides Rule 3 is to apply for all the DRX timers when 0.5 ms TTI length is in effect except the HARQ RTT timer which will scale with TTI, then this cell can implement this decision by only signaling to the affected UEs some indication that HARQ RTT timer is associated with Rule 2 for 0.5 ms TTI length operation (since Rule 3 continues the conventional timer implementation the same as with 1.0 ms TTI length).

FIG. 2 is a process flow diagram that summarizes some broader aspects of the above examples. First at block 202 it is determined that a transmission time interval (TTI) length is other than 1 ms for communication between a mobile node and a network node. For example, the mobile node may be a UE and the network node may be an eNodeB or other radio access node (relay node, remote radio head, etc.), and the TTI length may be established via explicit signaling between them. The eNodeB and UE determine this new TTI length is other than 1 ms when this new TTI length becomes effective for the radio communications between them. Then at block 204, while said TTI length of other than 1 ms is in effect, at least one timer related to discontinuous reception (DRX) is implemented according to a rule that defines a time duration of the timer different from a time duration of the same timer implemented when the TTI length is defined as 1 ms. Time duration for this comparison of 1 ms TT length versus other than 1 ms TTI length is measured in units of time, as opposed to a count of TTIs or a count of subframes. In one embodiment the rule at block 204 is used only when the TTI length of other than 1 ms is in effect.

In one specific embodiment, the at least one timer noted at block 204 is a hybrid automatic repeat request round trip time (HARQ RTT) timer, and the rule is to scale the timer according to the TTI length. In this case there may be a plurality of timers related to DRX, and at least one other timer of the plurality of timers related to DRX defines a time duration that remains unchanged despite the TTI length being other than 1 ms. Examples of this above include any of the DRX related timers associated with rule 3. In one example each timer of the plurality of timers related to DRX is associated with one rule of a set of rules, and each said timer is implemented according to its associated rule while said TTI length of other than 1 ms is in effect. The specific examples above had the set of rules including three rules according to the following:
   define a new sub-PDCCH subframe which refer to the TTI length, and count the timer in number of TTIs with PDCCH;
   define a new sub-subframe shorter than 1 ms and scale the timer to the TTI length; and
   keep the timer duration unchanged regardless of the TTI length.

In one implementation of the three rules immediately above, for each respective timer other than a DRX cycle timer that is associated with the rule "keep the timer unchanged regardless of the TTI length", that respective timer is re-started anytime a PDCCH is received while that respective timer is running (while said TTI length of other than 1 ms is in effect). In the above examples these respective timers would include the mac-ContentionResolution timer and the drx-Inactivity timer, while the DRXCycle timer and the drxShortCycle timer are the "DRX cycle timer" exceptions.

In one embodiment, network signaling and/or a published radio technology standard is used to make the association between each of the plurality of timers related to DRX and its respectively associated rule of the set of rules.

For the case in which the timers are associated to groups, each of the plurality of timers may be associated with either a first group or a second group for implementing each such timer while the TTI length of other than 1 ms is in effect. The table above had the second group associated with the on duration (onDuration) timer, the discontinuous reception inactivity (drx-Inactivity) timer, and the discontinuous reception retransmission (drx-Retransmission) timer; while the first group was associated with the contention resolution (mac-ContentionResolution) timer, the discontinuous reception cycle (DRXCycle) timer, the discontinuous reception short cycle (drxShortCycle) timer, and the hybrid automatic repeat request round trip time (HARQ RTT) timer.

In one specific implementation detailed above, the onDuration timer is started in a first or a second half of an offset subframe (of length 1 ms), where the first or second half is selected according to a value of a signaled bit and where the offset 1 ms subframe is identified by a drxStartOffset timer.

Or in other embodiments there can be only two rules in the set: do not change the effective value (time duration) when the TTI length changes, and scale the effective value (time duration) as the TTI changes.

It is notable that the process represented by FIG. 2, as well as any of the above more specific implementations of it, will typically be performed by both the network node/eNodeB and by the mobile node/UE. The UE obviously has these DRX timers so it can know when it is allowed to enter the low power state, but for each UE in the cell configured with DRX parameters the eNodeB also runs parallel timers of its own to track when the UE will be listening for a PDCCH addressing it, to track when there is still a HARQ process open, and the like. It is expected that in practice the eNodeB will decide if and when to change the TTI length and inform the affected UE of this, in which case the time at which this changed TTI length takes effect is when the eNodeB and the UE determine the TTI length is other than 1 ms as in block 202 of FIG. 2.

The invention may be embodied as a computer readable memory on which is tangibly stored computer program instructions that, when executed by one or more processors, cause a user equipment or eNodeB in which the memory and the one or more processors are disposed to perform the process represented by FIG. 2, as well as any of the above more specific implementations of it can be implemented.

Various of the aspects summarized above may be practiced individually or in any of various combinations.

FIG. 3 is a schematic diagram illustrating some components of the eNodeB and the UE mentioned above. In the wireless system/cell a wireless network is adapted for communication over a wireless link 11 with an apparatus such as a mobile communication device/node which may be referred to as a UE 10, via a radio network access node such as an eNodeB 20 (or other type of base station). The network may include a network control element (NCE, not shown) that may include mobility management entity/serving gateway (MME/S-GW) functionality, and which provides connectivity with a further network such as a telephone network and/or a data communications network (e.g., the internet).

The UE 10 includes a controller, such as a computer or a data processor (DP) 10D, a computer-readable memory medium embodied as a memory (MEM) 10B that stores a program of computer instructions (PROG) 10C, and a suitable wireless interface, such as radio frequency (RF) transmitter/receiver combination 10D for bidirectional wireless communications with the eNodeB 20 via one or more antennas. The UE 10 keeps the various DRX related timers 10E as detailed above by example, which may be implemented as software, hardware or a combination for example by the processor 10A running a clock with memory spaces reserved for the various DRX related timers.

The eNodeB 20 also includes a controller, such as a computer or a data processor (DP) 20A, a computer-readable memory medium embodied as a memory (MEM) 20B that stores a program of computer instructions (PROG) 20C, and a suitable wireless interface, such as RF transmitter/receiver combination 20D for communication with the UE 10 (as well as other UEs) via one or more antennas. The eNodeB 20 is coupled via a data/control path (not shown) to the NCE and this path may be implemented as an interface. The eNodeB 20 may also be coupled to another eNodeB via another data/control path, which may be implemented as a different interface. For this UE 10 and for each other UE in the cell that is configured with DRX parameters, the eNodeB 20 also keeps the various DRX related timers 20E as detailed above by example. Like the UE 10, these DRX timers 20E may be implemented as software, hardware or as some combination of hardware and software.

At least one of the PROGs 10C/20C is assumed to include program instructions that, when executed by the associated DP 10A/20A, enable the device to operate in accordance with exemplary embodiments of this invention as detailed above. That is, various exemplary embodiments of this invention may be implemented at least in part by computer software executable by the DP 10A of the UE 10; by the DP 20A of the eNodeB 20, or by hardware or by a combination of software and hardware (and firmware).

In various exemplary embodiments the UE 10 and/or the eNodeB 20 may also include dedicated processors, for example a RRC module, a RF front end, and the like. There may also be one or more modules that is/are constructed so as to operate in accordance with various exemplary embodiments of these teachings.

The computer readable MEMs 10B/20B may be of any type suitable to the local technical environment and may be implemented using any one or more suitable data storage technology, such as semiconductor based memory devices, flash memory, magnetic memory devices and systems, optical memory devices and systems, fixed memory and removable memory, electromagnetic, infrared, or semiconductor systems. Following is a non-exhaustive list of more specific examples of the computer readable storage medium/memory: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

The DPs 10A/20A may be of any type suitable to the local technical environment, and may include one or more of general purpose computers, special purpose computers, microprocessors, digital signal processors (DSPs) and processors based on a multicore processor architecture, as non-limiting examples. The wireless interfaces (e.g., the radios 10D/20D) may be of any type suitable to the local technical environment and may be implemented using any suitable communication technology such as individual transmitters, receivers, transceivers or a combination of such components.

In general, the various embodiments of the UE 10 can include, but are not limited to, smart phones, machine-to-machine (M2M) communication devices, cellular telephones, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, as well as portable units or terminals that incorporate combinations of such functions. Any of these may be embodied as a hand-portable device, a wearable device, a device that is implanted in whole or in part, a vehicle-mounted communication device, and the like.

It should be understood that the foregoing description is only illustrative. Various alternatives and modifications can be devised by those skilled in the art. For example, features recited in the various dependent claims could be combined with each other in any suitable combination(s). In addition, features from different embodiments described above could be selectively combined into an embodiment that is not specifically detailed herein as separate from the others. Accordingly, the description is intended to embrace all such alternatives, modifications and variances which fall within the scope of the appended claims.

The following abbreviations that may be found in the specification and/or the drawing figures are defined as follows:

3GPP Third Generation Partnership Project
DL downlink
DRX discontinuous reception
DwPTS downlink pilot time slot
eNodeB radio access node such as a base/relay station of an E-UTRAN
E-UTRAN evolved UMTS radio access network
FDD frequency division duplex
HARQ hybrid automatic repeat request
LTE long term evolution (of E-UTRAN)
MAC medium (layer 2) access control
ms milliseconds
OFDM orthogonal frequency division multiplex
PDCCH physical downlink control channel
PDSCH physical downlink shared channel
PUSCH physical uplink shared channel
QoS quality of service RN relay node
RRC radio resource control (layer 3)
RTT round trip time
TCP transmission/transport control protocol
TDD time division duplex
TS technical specification
TTI transmission time interval
UE user equipment
UL uplink
UMTS universal mobile telecommunications service

What is claimed is:

1. A method comprising:
determining that a length of time for a transmission time interval for communication between a mobile node and a network node is changed; and
implementing, for a plurality of timers related to discontinuous reception, each of said timers according to one rule of a set of rules that define a time duration of the respective timer while said changed length of time for the transmission time interval is in effect, and the set of rules comprises: define a new sub-physical downlink control channel subframe which refers to said changed length of time for the transmission time interval, and count the timer in number of said changed transmission time intervals with a physical downlink control channel; define a new sub-subframe with said changed length of time for the transmission time interval and scale the timer to said changed length of time for the transmission time interval; and keep the timer duration unchanged regardless of a length of time for the transmission time interval.

2. The method according to claim 1, wherein at least one other timer of the plurality of timers related to discontinuous reception defines a time duration that remains unchanged despite the changed length of time for the transmission time interval.

3. The method according to claim 1, wherein a given one of the plurality of timers is operated as one of: the given timer is reset when the length of time for the transmission time interval is changed; or the given timer which is running continues to be running but is scaled according to said changed length of time for the transmission time interval.

4. The method according to claim 1, wherein said changed length of time for the transmission time interval is in effect comprises said changed length of time for the transmission time interval is configured via one of radio resource control signaling, and/or activated via medium access control or physical downlink control channel signaling.

5. The method according to claim 1, wherein at least a given one of the plurality of timers is a hybrid automatic repeat request round trip time timer, and the rule is to scale the given timer according to said changed length of time for the transmission time interval.

6. The method according to claim 1, wherein the plurality of timers are associated with either a first group or a second group for implementing each of said timers while the changed length of time for the transmission time interval is in effect.

7. The method according to claim 1, further comprising starting an on duration timer in a first or a second half of an offset subframe according to a value of a signaled bit, wherein the offset subframe is identified by a discontinuous reception start offset timer when the unchanged length of time for the transmission time interval is in effect.

8. A non-transitory computer readable memory storing computer program instructions that, when executed by one or more processors, cause a user equipment or base station in which the memory and the one or more processors are disposed to:
determine that a length of time for a transmission time interval for communication between a mobile node and a network node is changed; and
implement, for a plurality of timers related to discontinuous reception, each of said times according to one rule of a set of rules that define a time duration of the respective timer while said changed length of time for the transmission time interval is in effect, and the set of rules comprises: define a new sub-physical downlink control channel subframe which refers to said changed length of time for the transmission time interval, and count the timer in number of said changed transmission time intervals with a physical downlink control channel; define a new sub-subframe with said changed length of time for the transmission time interval and scale the timer to said changed length of time for the transmission time interval; and
keep the timer duration unchanged regardless of a length of time for the transmission time interval.

9. An apparatus comprising at least one processor and a memory storing software code;
wherein the memory and the software code is configured with the at least one processor to cause the apparatus to at least:
determine that a length of time for a transmission time interval for communication between a mobile node and a network node is changed; and
implement, for a plurality of timers related to discontinuous reception, each of said timers according to one rule of a set of rules that define a time duration of the respective timer while said changed length of time for the transmission time interval is in effect, and the set of rules comprises: define a new sub-physical downlink control channel subframe which refers to said changed length of time for the transmission time interval, and count the timer in number of said changed transmission time intervals with a physical downlink control channel; define a new sub-subframe with said length of time for the transmission time interval and scale the timer to said changed length of time for the transmission time interval; and keep the timer duration unchanged regardless of a length of time for the transmission time interval.

10. The apparatus according to claim 9, wherein at least one other timer of the plurality of timers related to discontinuous reception defines a time duration that remains unchanged despite the changed length of time for the transmission time interval being in effect.

11. The apparatus according to claim 9, wherein a given one of the plurality of times is operated as one of: the given timer is reset when the length of time for the transmission time interval is changed; or the given timer which is running continues to be running but is scaled according to the length of time for the transmission time interval.

12. The apparatus according to claim 9, wherein said changed length of time for the transmission time interval is in effect comprises said changed length of time for the transmission time interval is configured via one of radio resource control signaling, and/or activated via medium access control or physical downlink control channel signaling.

13. The apparatus according to claim 9, wherein the memory and the software code is configured with the at least one processor to cause the apparatus further to: for each respective timer other than a discontinuous reception cycle timer that is associated with a rule of keep the timer duration unchanged regardless of the transmission time interval length, restart the respective timer in response to a physical downlink control channel being received while the respective timer is running and said changed length of time for the transmission time interval is in effect.

14. The apparatus according to claim 9, wherein: network signaling and/or a published radio technology standard associates each of the plurality of timers related to discontinuous reception with its associated one rule of the set of rules.

15. The apparatus according to claim 9, wherein at least a given one of the plurality of timers is a hybrid automatic repeat request round trip time timer, and the rule is to scale the given timer according to said changed length of time for the transmission time interval.

16. The apparatus according to claim 9, wherein the plurality of timers are associated with either a first group or a second group for implementing each of said timers while the changed length of time for the transmission time interval is in effect.

17. The apparatus according to claim 16, wherein: the timers associated with the second group include at least: an on duration timer, a discontinuous reception inactivity timer, and a discontinuous reception retransmission timer; and the timers associated with the first group include at least: a contention resolution timer, a discontinuous reception cycle timer, a discontinuous reception short cycle timer, and a hybrid automatic repeat request round trip time timer.

18. The apparatus according to claim 9, wherein the memory and the software code is configured with the at least one processor to cause the apparatus further to start an on duration timer in a first or a second half of an offset subframe according to a value of a signaled bit, wherein the offset subframe is identified by a discontinuous reception start offset timer when the unchanged length of time for the transmission time interval is in effect.

19. The apparatus according to claim 9, wherein the apparatus comprises the mobile node which is embodied as a user equipment.

20. The apparatus according to claim 9, wherein the apparatus comprises the network node which is embodied as a base station.

* * * * *